Figure 1:
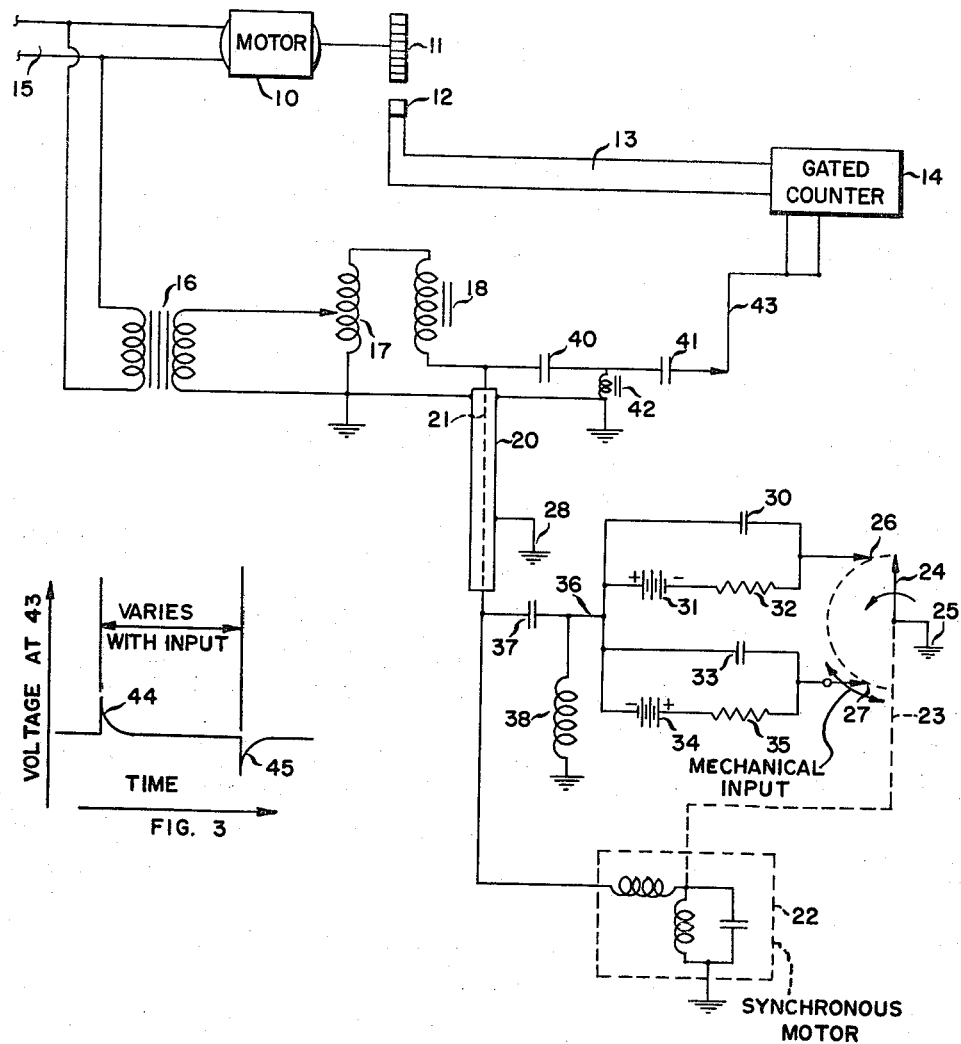

June 15, 1965     T. R. REINHART     3,189,881
PULSE PRODUCING MEANS FOR TELEMETERING SYSTEM
Filed Dec. 28, 1961     2 Sheets-Sheet 1

INVENTOR:
T. R. REINHART
BY: Theodore E. Bieber
HIS ATTORNEY

INVENTOR:
T. R. REINHART
BY:
HIS ATTORNEY

United States Patent Office 3,189,881
Patented June 15, 1965

3,189,881
PULSE PRODUCING MEANS FOR TELEMETERING SYSTEM
Tom R. Reinhart, Houston, Tex., assignor to Shell Oil Company, New York, N.Y., a corporation of Delaware
Filed Dec. 28, 1961, Ser. No. 162,820
4 Claims. (Cl. 340—206)

This invention relates to telemetering devices and more particularly to a circuit for providing two pulses having distinctively different characteristics therein.

In a copending application of Robert H. Kolb, Serial No. 715,893, filed February 18, 1958, and entitled, "Remote Telemetering and Recording System," now Patent No. 3,007,134, there is disclosed and claimed a telemetering system in which the remote instrument is connected to a conveniently located recording system by a single conductor cable with the change in the impedance of the cable being utilized to indicate the occurrence of specific events at the remote location. More particularly, the magnitude of a physical charactristic is telemetered by having the characteristic vary the position of a movable contact with respect to a fixed contact. The reference or fixed contact and the movable contact are to be contacted by a sweep contact which cyclically contacts both the reference and the movable contact. Normally the reference and movable contact are disposed along the periphery of a circle while the sweep contact is rotated by a synchronous motor means. Thus, by measuring the arc between the reference and movable contacts, the magnitude of the physical condition can be telemetered. This arc is measured by transmitting separate pulses indicating when the sweep contact contacts both the reference and movable contacts. In the above copending application, these pulses were indicated by the change in the impedance of the cable coupled to the remote instrument with the impedance being changed by open circuiting or short circuiting the cable used to couple the remote instrument to the recording system.

While the above system is satisfactory it is limited to the use of particularly telemetering frequencies in order to produce a measurable difference between the open circuit and short circuited conditions. Normally it is desirable to use a telemetering frequency as high as possible in order to improve the results, but the use of the impedance signaling means requiring a much lower frequency. This is required even though the attenuation characteristics of the normal cables used would permit the transmission of much higher frequency information.

Accordingly, it is a principal object of this invention to provide a new and novel means for generating pulses in a telemetering system that indicates the occurrence of a specific event.

A still further object of this invention is to provide a simple means for generating positive and negative pulses in a telemetering system with the pulses being readily transmittible over a cable connecting the various units of the telemetering system.

The above objects and advantages of this invention are achieved by coupling the reference contact to a first capacitor and the movable contact to a second capacitor. A source of direct current potential is connected to the two capacitors to charge the two capacitors in electrical composition. The sweep contact is coupled to the instrument ground and is rotated in a path so as to cyclically contact both the refernece and movable contacts. When the sweep contact contacts the reference and movable contacts it will short the respective capacitors to ground thus generating a sharp pulse of relatively large amplitude as the capacitor is discharged to the ground. The polarity of the pulse generated will depend of course on whether the capacitors were positively or negatively charged.

Figure 2:
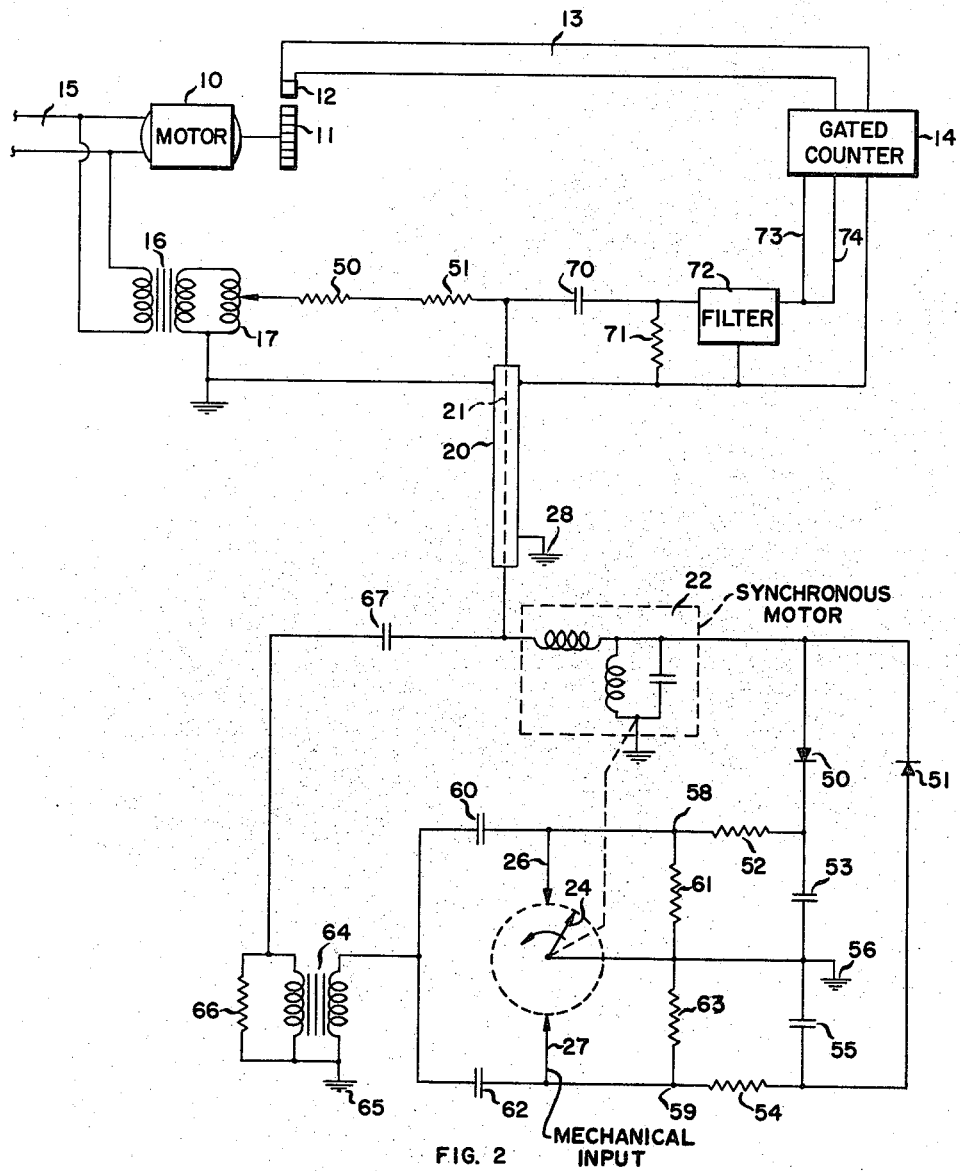

The above objects and advantages will be more easily understood from the following detailed description of a preferred embodiment when taken in conjunction with the attached drawings; in which FIGURE 1 is a schematic drawing of a telemetering system constructed in accordance with this invention and utilizing batteries disposed in the remote instrument for charging the capacitors;

FIGURE 2 shows a second embodiment of this invention in which the alternating current used for powering the synchronous motor at the remote location is rectified and used for charging the capacitors; and FIGURE 3 illustrates the wave form of the pulses generated by the system of this invention.

Referring now to FIGURE 1 there is shown a recording system disposed at the convenient location. In the above-referenced copending application, the telemetering system is described with relation to its use for telemetering the pressure from the bottom of a borehole to the surface. Thus, the recording system will be located at the surface. The recording system utilizes a synchronous motor 10 to drive a pulse producing means for producing high frequency pulses. The pulse producing means may consist of a notched wheel 11 driven by the motor 10 through a gear train not shown to induce periodic pulses in a magnetic type or pick-up 12. The pick-up 12 is coupled to a gated counter 14 by means of conductor 13. The motor 10 is powered from an alternating current power source 15 which may be normal 60 cycle single phase alternating current. The power source 15 is also coupled to the downhole portion of the equipment through an isolation transformer 16 and an auto transformer 17. A choke means 18 is disposed in the connection between the audio transformer 17 and the central conductor 21 of the well cable to block the gating pulses transmitted from the downhole instrument. The other side of the power supply is coupled to the sheath 20 of the well cable wth the sheath 20 in turn being grounded at 28.

The downhole instrument consists of a synchronous motor 22 which is coupled to the sweep contacts 24 by means of a connection shown schematically at 23 that may include a gear reduction. The sweep contact 24 is coupled to a ground 25. The reference contact 26 and the movable contact 27 are disposed in the path of the sweep contact 24 so that they are contacted once for each rotation of the sweep contact 24. As explained in the above-referenced application, the movable contact 27 is rotated about the axis of rotation of the sweep contact 24 an amount proportional to the information being telemetered, for example, when it is desired to telemeter the downhole pressure the movable contact 27 may be positioned by a Bourdon tube type of pressure gauge.

The reference contact 26 is coupled to a capacitor 30 which is charged positively from a power supply 31 through a resistor 32. The movable contact 27 is coupled to a similar capacitor 33 which is charged negatively from a power supply 34 through a resistance 35. The capacitors 30 and 33 and resistances 32 and 35 should be of similar values and selected so that the time constant for charging the capacitors is considerably less than the time required for the sweep contact to make a full cycle. The two capacitors are coupled together and to the central conductor 21 of the well cable by conductor 36. Disposed in the conductor 36 is a capacitor 27 while an inductance 38 is coupled between the conductor 36 and ground. The capacitor 37 and inductance 28 form a filter circuit for blocking the 60 cycle power from the capacitors 30 and 33 and charging circuits for the reference and movable contacts. At the surface central conductor 21 of the well cable is coupled to the gated counter 14 through a filter circuit that includes two capacitors 40 and 41 and a grounded choke coil 42. The values of these units should be chosen so as to block the 60 cycle power supply from being fed to the counter while permitting passage of the two pulses that are generated when the capacitors 30 and 33 are shorted to ground. The filter circuit is connected to the gated counted by conductor 43. Of course, the gate for the gated counter 14 should be constructed to respond to the pulses transmitted from the downhole instrument to start and stop the counter.

When the above system is operated the 60 cycle supply is coupled to the instrument and energizes both the synchronous motor 19 which drives the pulse producing means at the surface and the synchronous motor 22 that drives the sweep contact in the downhole instrument. When the sweep contact contacts the reference contact 26 it will short the capacitor 30 to the ground 25. This will permit the capacitor 30 to discharge and generate a positive pulse having a wave form similar to the wave form 44 in FIGURE 3. As the sweep contact continues rotating as shown by the arrow in FIGURE 1, it will contact the movable contact 27 and couple the capacitor 33 to the ground 25. This will permit the capacitor 33 to discharge and generate a negative pulse having a wave form similar to the wave form 45 shown in FIGURE 3. It will be noted that the wave form 45 is similar to the wave form 44 but of opposite polarity. The opposite polarity is obtained, of course, by disposing the battery 34 to charge the capacitor 33 negatively or of the opposite polarity to the charge placed on the capacitor 30. The two pulses 44 and 45 are transmitted to the surface over the well cable and passed by the filter circuit to the gated counter 14. The counter gate should, of course, be disposed to open when it receives the positive pulse 44 and close when it receives the negative pulse 45. Thus, the counter 14 will count the pulses that occur during the time required for the sweep contact 24 to pass from the reference contact 26 to the movable contact 27. Since the frequency of the pulses are directly related to the speed of rotation of the sweep contact 24 the pulses counted during this interval will be directly related to the angular displacement of the movable contact from the reference contact. This angular displacement is, of course, controlled by the magnitude of the information being telemetered. Thus, the count appearing on the counter is a direct measurement of the information being telemetered.

Referring now to FIGURE 2, there is shown a second embodiment of this invention which is similar to the embodiment shown in FIGURE 1 but utilizes a rectifying circuit in the downhole instrument for supplying the direct current power for charging the capacitors. The surface located portion of the system is substantially the same except that an inductance 50 and a resistance 51 are disposed in the connection between the auto transformer and the central conductor 21 of the well cable. These perform the filter function that was performed by the choke 18 shown in FIGURE 1. In the downhole instrument the synchronous motor 22 drives the sweep contact 24 through a path that includes the reference contact 26 and the movable contact 27. The alternating current power transmitted to the downhole instrument is rectified by the two diodes 50 and 51. The rectified power is filtered by the capacitors 53 and 55 and resistances 52 and 54. The two capacitors 53 and 55 are coupled together and to a common ground 56. Thus, the potential appearing at the junction 58 will be positive, while the potential appearing at the junction 59 will be negative. The reference contact 26 is coupled to a capacitor 60 which is charged from the positive potential at the junction 58 through resistance 61 which is connected to the ground 56. The movable contact 27 is coupled to a capacitor 62 which charges from negative potential at the junction 59 through resistance 63 which is also coupled to the common ground 56. The capacitors 60 and 62 should have substantially the same values while the resistances 61 and 63 should also be of similar values. Thus, the capacitors 60 and 62 will be charged to equal and opposite potentials. The two capacitors 60 and 62 are coupled together and to the central conductor 21 of the well cable through an isolation transformer 64. The primary of the isolation transformer is grounded at 65 while the secondary is coupled to the conductor 21 through a filter circuit including a resistance 66 and capacitance 67. The filter circuit and the isolation transformer serve to block or prevent the alternating current used for power in the downhole instrument from flowing in the capacitor circuits associated with the reference and movable contacts.

At the surface, the central conductor 21 is coupled to the gated counter 14 through a filter circuit that includes a capacitance 70 and a resistance 71 and a separate filtering circuit 72. This filtering circuit performs the same filtering operation that is performed by the capacitors 40 and 41 and choke 42 in FIGURE 1. The filter circuit 72 is coupled to the gated counter by leads 73 and 74. Two separate leads are shown in order that the positive pulse that is generated when the sweep contact 24 passes the reference contact 26 may be used to start and count while the negative pulses generated when the sweep contact passes the movable contact 27 may be used to stop the counter.

The system shown in FIGURE 2 and described above, operated in substantially the same manner as the circuit described with relation to FIGURE 1. As explained above, the major difference is that the circuit of FIGURE 2 utilizes a rectifying circuit in the downhole instrument to supply the direct current potential required for charging the capacitors. The pulses generated by the circuit in FIGURE 2 have exactly the same wave form as the pulse of FIGURE 1 and are similar to pulses 44 and 45 shown in FIGURE 3. The pulses generated when the sweep contact 24 passes the reference contact will be positive while a negative pulse will be generated when the sweep contact passes the movable contact 27. The polarity of these pulses could, of course, be easily reversed or changed by merely charging the capacitor 60 negatively while applying a positive charge to the capacitor 62. The particular polarity of the pulses from each of the contacts will, of course, depend upon whether one desires to measure the angle between the reference and movable contacts or the complement of this angle. Of course, the design of the counter and its gate circuit will also influence the polarity for the two pulses chosen.

While this invention has been described with reference to its use in telemetering information from the bottom of a borehole to a surface recording system, it of course, may be used to telemeter information from remote locations to convenient locations. The only requirement being that the two locations be coupled together by an electrical circuit capable of transmitting power to the remote location and pulses from the remote location. Accordingly, this invention should not be limited to the details described herein but only to its broad spirit and scope.

I claim as my invention:

1. A system for telemetering a magnitude of a measurement made at a remote location to a measuring system located at a convenient location, said system comprising:
   a remote instrument having a fixed reference contact and a movable contact said fixed and reference contacts disposed along a common path, said movable contact in addition being mounted to be displaced with respect to said reference contact an amount related to the magnitude of the measurement to be telemetered;
   a sweep contact disposed to be driven by a motor means along said common path to cyclically contact both said reference and movable contacts;
   a first capacitor coupled to said reference contact, a second capacitor coupled to said movable contact;
   a source of direct current potential located at said remote location and coupled to both said first and second capacitors to charge said capacitors in electrical opposition to each other;

said sweep contact being coupled to ground and said reference and movable contacts being coupled to a cable, said cable coupling said remote instrument to the measuring system at said convenient location to transmit over said cable the equal and opposite pulses produced when said sweep contact contacts said reference and movable contacts.

2. A system for telemetering the magnitude of a measurement made at a remote location to a measuring system located at a convenient location, said system comprising:
   a remote instrument having a fixed reference contact and a movable contact disposed along a common circular path, said movable contact being mounted for rotation along said common circular path with respect to said reference contact an amount related to the magnitude of the measurement to be telemetered;
   a cable coupling said remote instrument to an alternating current power supply located at said convenient location;
   a sweep contact disposed in said remote instrument and driven by a synchronous motor means to rotate through said common circular path to cyclically contact both said reference and movabe contacts;
   a first capacitor coupled to said reference contact, a second capacitor coupled to said movable contact;
   a rectifying means located at said remote location and coupled to said cable to convert said alternating current to direct current, said rectifying means also being coupled to both said first and second capacitors to charge said capacitors in electrical opposition to each other;
   said sweep contact being coupled to ground and said reference and movable contacts being coupled to said cable to transmit to the convenient location over said cable the equal and opposite pulses produced when said sweep contact contacts said reference and movable controls.

3. A system for producing pulses of opposite polarity when a movable contact repeatedly and cyclically traverses a path and contacts first and second contacts disposed along said path, said system comprising:
   a first capacitor coupled to the first contact and a second capacitor coupled to the second contact;
   a source of direct current coupled to said first and second capacitors to charge said first and second capacitors in electrical opposition;
   he movable contact being coupled to electrical ground and said first and second capacitors being coupled to a circuit for transmission to a receiver the equal and opposite pulses produced when said movable contacts said first and second contacts.

4. A system for telemetering the magnitude of a measurement made at a remote location to a measuring system located at a convenient location, said system comprising:
   a remote instrument having a fixed reference contact and a movable contact disposed along a circular path, said movable contact being mounted for rotation about said circular path with respect to said reference contact an amount related to the magnitude of the measurement to be telemetered;
   a sweep contact disposed to be driven by a motor means to rotate through said circular path to cyclically contact both said reference and movable contacts;
   a first capacitor coupled to said reference contact, a second capacitor coupled to said movable contact;
   a source of direct current potential coupled to both said first and second capacitors to charge said capacitors in electrical opposition to each other;
   said sweep contact being coupled to ground and said reference and movable contacts being coupled to a cable, said cable coupling said remote instrument to the measuring system at said convenient location to transmit over said cable the equal and opposite pulses produced when said sweep contact contacts said reference and movable contacts.

References Cited by the Examiner
UNITED STATES PATENTS

| 2,436,563 | 2/48 | Frosch | 340—208 |
| 3,007,134 | 10/61 | Kolb | 340—210 |

FOREIGN PATENTS 767,963  4/55  Germany.

NEIL C. READ, *Primary Examiner.*

THOMAS B. HABECKER, *Examiner.*